United States Patent [19]

Quartarone

[11] 4,146,281
[45] Mar. 27, 1979

[54] ARTICULATED ELECTRICAL EXTENSION DEVICE

[76] Inventor: Carmelo Quartarone, 28 Troy La., Yonkers, N.Y. 10701

[21] Appl. No.: 801,081

[22] Filed: May 27, 1977

[51] Int. Cl.² .......................................... H01R 31/00
[52] U.S. Cl. .................................. 339/2 R; 339/28; 339/34
[58] Field of Search ...................... 339/1, 2, 4, 5, 7, 8, 339/23, 28, 34, 119, 120, 122, 123, 147, 153–164, 167, 168, 170; 174/57, 69

[56] References Cited

U.S. PATENT DOCUMENTS

| 2,362,481 | 11/1944 | Hartmann | 339/2 R |
| 2,806,941 | 9/1957 | Graziani | 339/123 |
| 3,221,287 | 11/1965 | Rooney | 339/28 |

Primary Examiner—Neil Abrams
Attorney, Agent, or Firm—Curtis Ailes

[57] ABSTRACT

The device includes a fixed extension body member including an auxiliary electrical outlet plate at one end thereof adapted to be supported over a standard double electrical wall outlet, and an articulated arm member pivotally connected to the upper end of the fixed extension body member with a standard electrical plug receptacle at the outer end of the arm member. Electrical conductors are carried by the arm member and the body member for connecting the plug receptacle to the wall outlet with which the auxiliary electrical outlet plate is associated.

14 Claims, 11 Drawing Figures

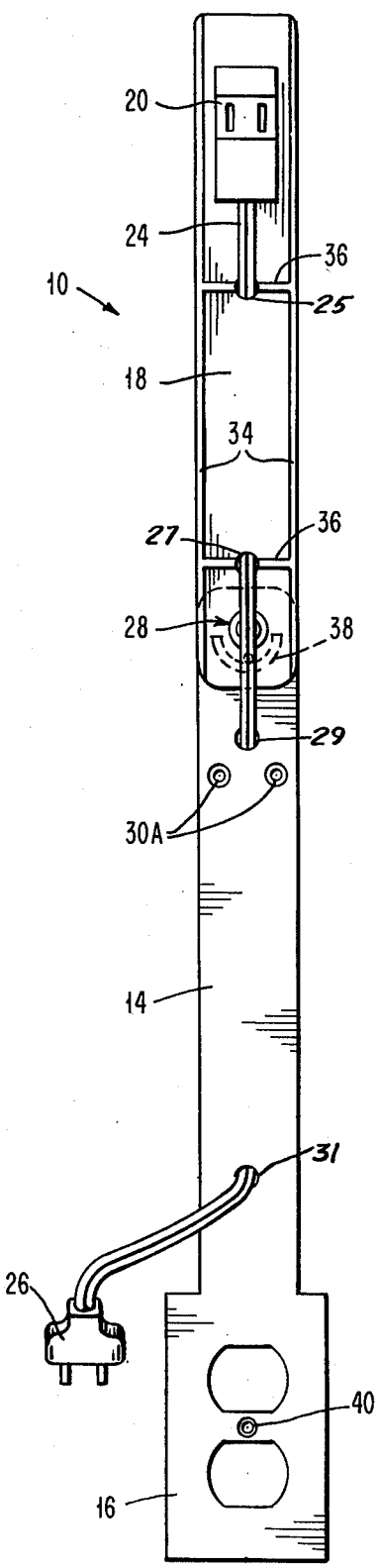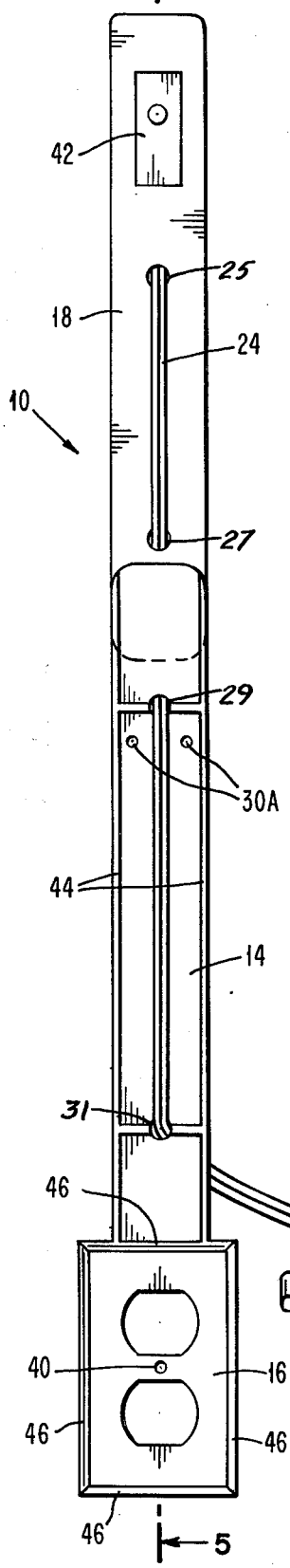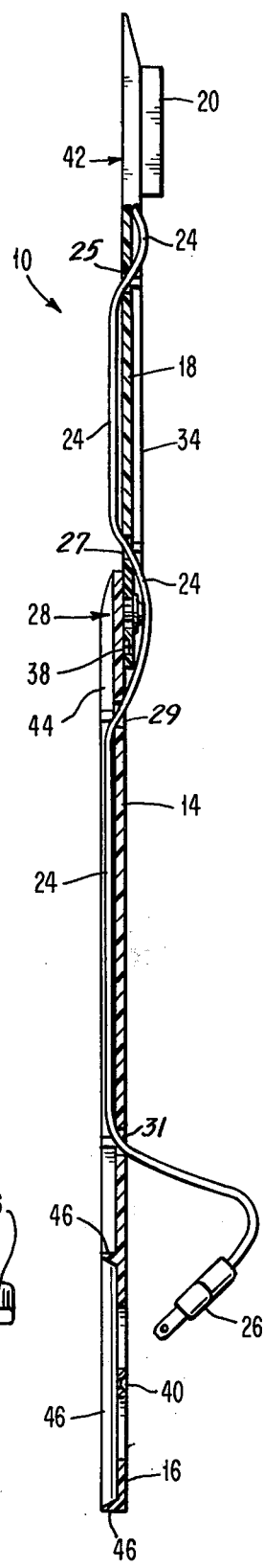

ARTICULATED ELECTRICAL EXTENSION DEVICE

This invention relates to electrical extension devices, and particularly to an articulated electrical extension device which is especially convenient for use in homes and offices, generally for the purpose of providing an electrical outlet which is more conveniently positioned upon the wall than is the usual electrical outlet.

It is common practice to provide electrical outlets in homes and offices for one-hundred ten volt electrical devices which are located on the walls of a room at an elevation of about 30 cm. While this position for the electrical outlets is usually regarded as convenient, it often occurs that an outlet which is desired to be used is totally obstructed by a piece of furniture, such as a sofa, or a tall cupboard of the kind which is frequently referred to as a hutch cupboard. Accordingly, it is one object of the present invention to provide an electrical extension device which avoids the problem of obstruction of an electrical outlet by a large piece of furniture.

Another important problem in the use of electrical outlets, particularly for portable appliances such as vacuum cleaners, is that many people find it very difficult to lean over for the purpose of plugging in the appliance. This problem is extremely difficult for the many people who have temporary or permanent back ailments. The problem is even worse if it means reaching behind a piece of furniture such as a sofa.

Accordingly, it is another important object of the invention to provide a convenient electrical extension device which generally provides an increased vertical elevation of the available electrical outlet so as to make the outlet much more convenient for those who have back ailments or other disabilities which make reaching down difficult.

Other objects and advantages of the invention will be apparent from the following description and the accompanying drawings.

In carrying out the invention, in one preferred embodiment thereof, there is provided an articulated electrical extension device for providing a convenient electrical connection supply outlet comprising a fixed extension body member including an auxiliary electrical outlet plate comprising one end thereof and adapted to be attached and supported over a standard double electrical wall outlet for receiving 110 volt electrical plug connectors with the other end of said fixed extension body member extending upwardly from said auxiliary electrical outlet plate, said auxiliary outlet plate member including standard openings for plug receptical outlets, an articulated arm member pivotally connected to the upper end of said fixed extension body member and operable to be positioned in vertical alignment with said fixed extension body member to form a further vertical extension of said fixed body or to be positioned on either side of said upper end of said fixed body to provide a horizontal extension, the outer end of said articulated arm member including a standard electrical plug receptacle, an electrical plug connector and electrical conductors carried by said arm member and said fixed body member and connecting said receptacle to said plug connector, said plug connector being adapted to be plugged into the standard wall outlet after the attachment of said extension device by attachment of said auxiliary outlet plate to the standard wall outlet.

In the accompanying drawings:

FIG. 3 is a front view of the device as shown in FIGS. 1 and 2 drawn to a larger scale to show greater detail.

FIG. 4 is a rear view of the device of FIG. 3 and showing further details of the device.

FIG. 5 is a sectional side view taken at section 5—5 in FIG. 4 and illustrating still further details of construction.

Figure 6:
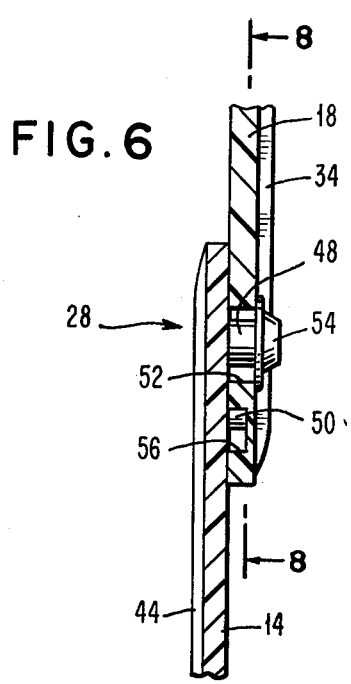
FIG. 6 is an enlarged sectional detail of the articulated pivotal connection portion of the structure of the prior figures.
Figure 7:
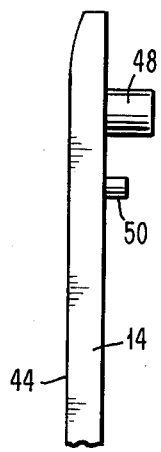
FIG. 7 is an enlarged full detail of the top portion of the fixed body member of FIG. 6.

FIGS. 8A, 8B, 8C, and 8D illustrate the details of the pivotal connection of FIGS. 6 and 7 in partial front sectional views which show different positions of the connection.

Figure 1:
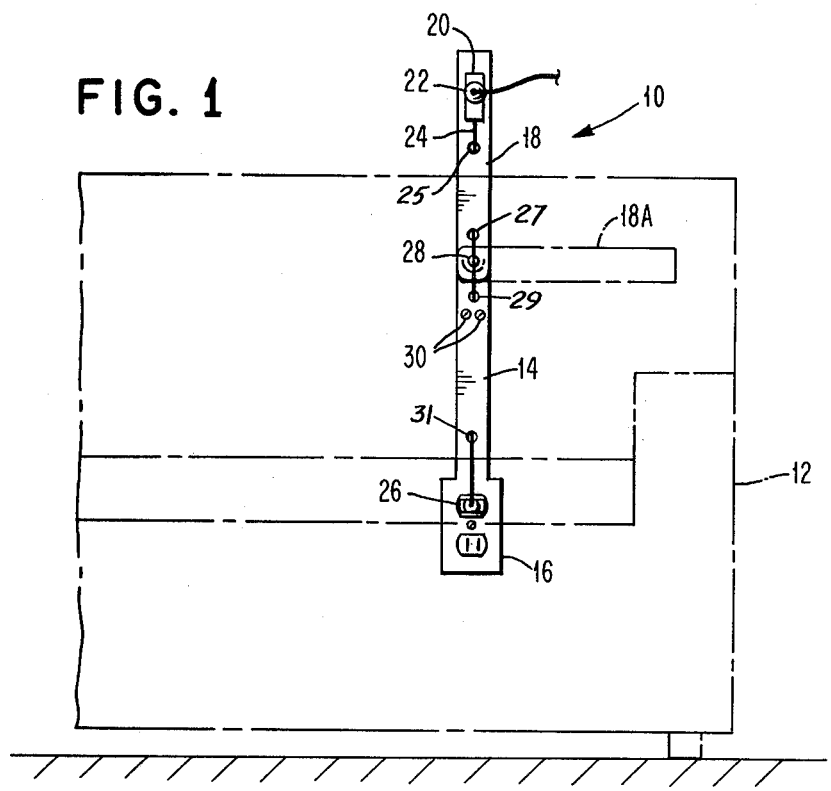
FIG. 1 is a front view of an articulated electrical extension device in accordance with the invention which has been installed in a position generally behind a sofa.

Referring more particularly to FIG. 1, there is shown an articulated electrical extension device 10 in accordance with the invention which has been installed upon a wall behind a sofa indicated at 12 in phantom. The device 10 includes a fixed extension body member 14 including an auxiliary electrical outlet plate 16 at one end thereof which is adapted to be attached and supported over a standard double electrical wall outlet for receiving 110 volt electrical plug connectors. At the upper end of the fixed extension body member 14, at 28, there is pivotally connected an articulated arm member 18 which is operable to be positioned, as shown, in vertical alignment with the fixed extension body member 14 to form a further vertical extension of the fixed body member. The outer end of the articulated arm member 18 includes a standard electrical plug receptacle 20 which is illustrated as in use with a plug connector 22 inserted therein. The device also includes electrical conductors 24 which extend downwardly from the plug receptacle 20, and which are threaded in and out through center line perforations 25, 27, 29, and 31 in the arm member 18 and in the body member 14, and which terminate in a plug connector 26 which is illustrated in use and plugged into the wall outlet with which the device is associated. Thus, power is supplied from the plug connector 26 and the associated wall outlet through the conductors 24 to the outlet 20, and thus is available to the appliance which is plugged into the receptacle 20 by means of the appliance plug 22.

It is to be seen and appreciated that when the device is arranged as illustrated in FIG. 1, the outlet 20 is very accessible at a convenient height above the top of the sofa 12, and can be used without the necessity for moving the sofa 12 out and away from the conventional wall receptacle which is low on the wall behind the sofa. When the appliance supplied by the plug connector 22 is no longer needed, the plug connector may be pulled out, and the articulated arm member 18 may be rotated about the pivot 28 to a substantially horizontal position indicated in phantom at 18A. In this position, the articulated arm member 18 and the associated plug receptacle 20 are completely hidden behind the sofa 12, but they are near enough to the top of the rear of the sofa so that a user may easily reach behind the sofa and lift the articulated arm member into the position indicated at 18 for use whenever desired. An indexing means is preferably provided, as described more fully below, to maintain the arm in the vertical position when desired. The entire device 10 is arranged to be physically attached to the electrical wall outlet and supported thereon. However, if desired, additional screw threaded fastenings may be used to attach the fixed body member to the wall. These additional attachments are illustrated at 30.

In a preferred physical embodiment of the invention, the dimensions of the device are such as to provide a total vertical extension from the center of the auxiliary outlet plate 16 to the outlet socket 20, when the device is vertically extended, with the arm upright, of about 57 centimeters. Similarly, the dimension from the pivot 28 to the outlet socket 20 is about 23 centimeters. While the dimensions of the device are not absolutely critical, these dimensions have been found to be very satisfactory, and it is believed that these basic dimensions generally should be at least as great as the dimensions given above. These dimensions generally permit vertical clearance of the socket 20 above the top of a sofa, such as the sofa 12 in FIG. 1, when the device is arranged with arm 18 in the vertical position.

The total length dimension of 57 centimeters is effective to provide a total elevation of the socket 22 above the floor of a room of about 87 centimeters when attached to an electrical wall outlet at the usual elevation of 30 centimeters above the floor of the room.

Figure 2:
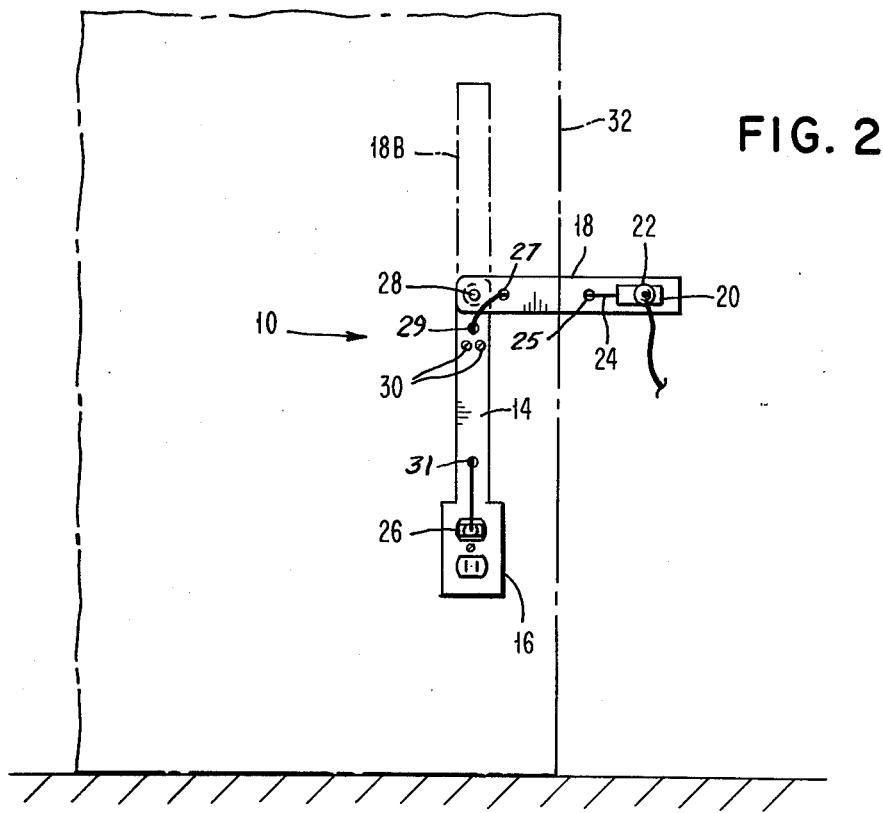
FIG. 2 is a front view of an articulated electrical extension device in accordance with the invention which is installed behind a tall piece of furniture such as a hutch cupboard.

FIG. 2 illustrates the same device 10 installed behind a high piece of furniture indicated in phantom at 32. The furniture 32 may be a high cupboard such as is commonly referred to as a hutch cupboard. In this instance, the electrical outlet 20 provided by the electrical extension device is not only raised from the regular outlet level, but is moved laterally to one side by placing the arm 18 in the horizontal position as illustrated in FIG. 2. When the appliance connected by the plug connector 22 is no longer required, and is unplugged, the arm 18 may be raised into a hidden position indicated in phantom at 18B, from which it can be easily retrieved when needed.

FIG. 3 is a front view of the device 10, as illustrated in FIGS. 1 and 2, and illustrating the device in a larger scale so as to show the details of the preferred structure more clearly. The plug receptacle 20 may be of conventional construction, and is therefore not shown or described in great detail in the drawings. The conductors 24 may be in the form of a standard double conductor insulated cord sometimes referred to as a "rip-cord". The plug connector 26 is preferably molded to the insulation of the cord 24 so that they provide a unitary structure.

As further illustrated in FIG. 3, the outer surface of the arm 18 may preferably include reinforcing ribs 34 extending along the vertical side edges thereof for adding additional stiffness to the arm member. Cross ribs may also be employed, partly for stiffening, and partly for decorative effect, as indicated at 36. At the pivotal connection 28, the arm 18, which comprises a rather flat structure, is preferably assembled over the front surface of the upper end of the fixed body member 14, which is also a substantially flat structure. As discussed in connection with FIGS. 1 and 2, the fixed body member 14 may be fastened directly to the wall by means of screw-threaded fastenings. The countersunk holes for those fastenings are shown at 30A in FIG. 3.

FIG. 3 also illustrates, in dotted lines at 38, an interior arcuate groove which provides a convenient stop for the pivotal movements of the arm 18 with respect to the body 14, as described more fully below.

The device is preferably attached to the electrical outlet by means of a countersunk screw hole 40 provided in the center of the auxiliary outlet plate portion 16 of the body member 14. The usual electrical outlet cover plate screw is preferably removed from the electrical outlet, and a longer screw having the same threads is inserted through the hole 40 and through the conventional cover plate of the outlet and into the screw threaded hole in the outlet, and then tightened in place to hold the device in place upon the wall above the outlet. As previously mentioned above, in order to further secure the device, screws may preferably be applied through the holes 30A directly to the wall.

Further details of the structure are illustrated by FIGS. 4 and 5 which are respectively a rear view and a sectional side view of the device 10. As shown particularly in FIG. 4, a cover plate 42 may be provided to close the back of the plug receptacle 20, and preferably to provide a substantially flush rear surface for the arm 18. The body 14 may preferably include reinforcing side edge ribs 44 at the rear surface thereof which correspond to the side edge ribs 34 on the front surface of the arm 18.

More importantly, however, around the rear edge portions of the auxiliary electrical outlet plate 16 there are provided rearwardly extending flanges 46 which are dimensioned, arranged, and contoured to embrace the edges of a conventional outlet plate when the auxiliary outlet plate is secured to the outlet to thereby provide added stability in the positioning of the fixed extension body with respect to the electrical outlet.

The last mentioned feature is shown with greater clarity in the sectional side view of FIG. 5 which is taken on section 5—5 of FIG. 4.

The special structure of the pivotal connection 28 of the arm member 18 to the body member 14 is shown in detail in FIG. 5. However, because of the complexity of the structure, it is also shown and is described in detail in the enlarged sectional detail view of FIG. 6. Pivot 28 is also described in conjunction with FIG. 7, which is an enlarged non-sectional detail of the upper end of body member 14. The details of the structure of the pivot 28 are also further illustrated in FIGS. 8A–8D. FIG. 6 generally corresponds to the pivotal connection portion 28 of FIG. 5, taken at the same section, but simply shown in a larger scale.

FIG. 7 illustrates that, at the upper end of body member 14, there is provided a pivot pin 48, and a shorter and smaller stop pin 50, protruding from the front face of the body member 14. The pins 48 and 50 are preferably integrally molded with the body member 14.

As shown in the sectional view of FIG. 6, the arm member 18 is attached to the body member 14 by inserting the pin 48 through a pivot pin opening 52 in the arm 18. The attachment is completed by placing a cap member 54 over the end of the pin 48 which has a flange which is large enough to prevent removal of the arm 18 from the pin 48. The cap 54 is preferably a metallic cap which has built-in springlike fingers which grip the material of the pin after the cap is once assembled, and which prevent subsequent removal of the cap.

The stop pin 50 is accommodated within the arm 18 by an arcuate groove 56 which is formed in the back surface of the arm 18. The structure and function of the arcuate groove 56 and the stop pin 50 are more clearly illustrated in FIGS. 8A–8D, all of which are sectional details taken at section 8—8 in FIG. 6.

Figure 8A:
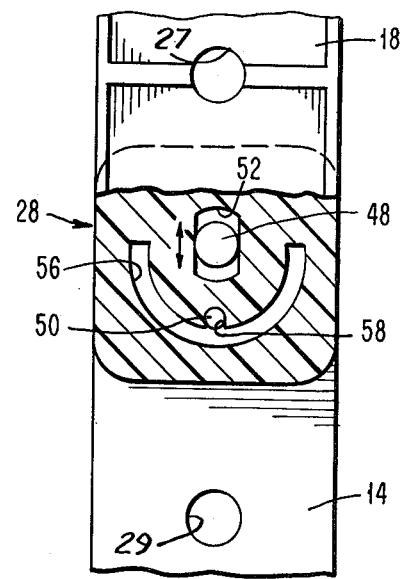
Figure 8C:
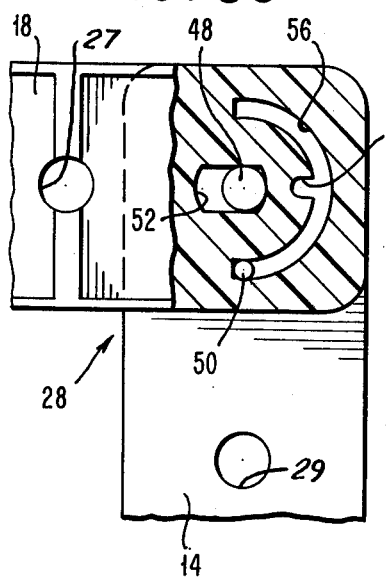
Figure 8B:
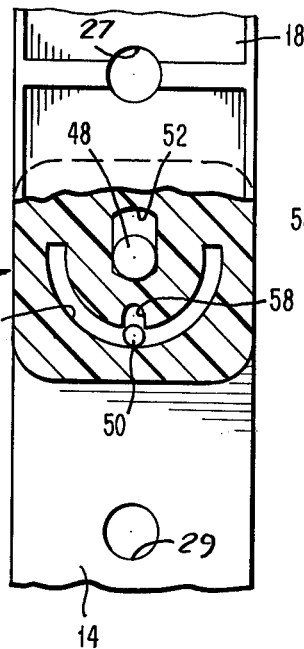
Figure 8D:
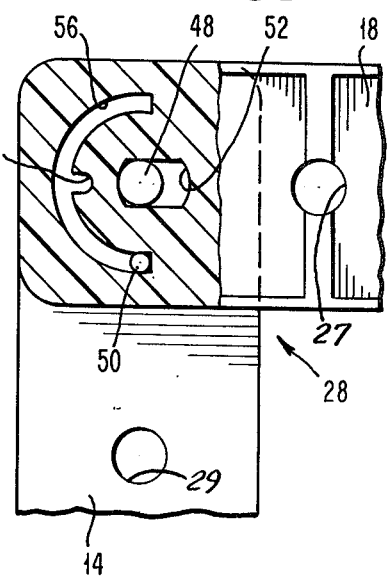

As shown in FIGS. 8B, 8C, and 8D, the arm 18 may be rotated from the vertical position illustrated in FIG. 8B to a substantially horizontal position on the left, as illustrated in 8C, or to a substantially horizontal position on the right, as illustrated in FIG. 8D. In each of the extreme positions of FIGS. 8C and 8D, the end of the arcuate groove 56 is engaged against the cooperating stop pin 50, thus holding and maintaining the position of the arm in a substantially horizontal limit position. Thus, as illustrated particularly by FIGS. 8C and 8D, the arcuate length of the arcuate groove 56 is just in excess of 180° to provide for a total of 180 degrees of rotation of the arm 18 with respect to the body member 14.

As particularly indicated in FIG. 8B, the arcuate groove 56 preferably includes a detent opening 58. Also, the pivot pin opening 52 is preferably a slotted opening. The pivot pin opening 52 and the detent 58 are preferably aligned along the center line of the arm 18, and the elongated dimension of the slot of the opening 52 is preferably aligned on the center line as well. This permits a vertical downward movement of the arm 18 when in the vertical position illustrated in FIG. 8B into a locked position as illustrated in FIG. 8A. In the locked position, the walls of the detent 58 embrace the stop pin 50 so as to prevent rotation from the locked position and thereby maintain the arm 18 in the vertically aligned position illustrated in FIG. 8A. The locked position of the arm 18 is also intended to be illustrated in FIGS. 5 and 6.

Referring back again to FIG. 8A, when the arm is to be rotated to one of the horizontal positions illustrated in FIGS. 8C and 8D, the arm 18 must first be vertically raised, with respect to the body member 14, into the unlocked position illustrated in FIG. 8B. From this unlocked position, the arm may be freely rotated to either of the horizontal positions illustrated in FIGS. 8C and 8D.

It is to be noted that normal gravity force upon the arm member 18 will tend to maintain the arm 18 in the locked position illustrated in FIG. 8A.

The arm member 18 and the body member 14 are preferably formed of a molded synthetic resin material such as a high impact polystyrene, or an acrylonitrile-butadiene-styrene.

It will be appreciated that many modifications of the invention are possible. For instance, the pins 48 and 50 need not be in the same member. Thus, the stop pin 50 may be provided in the arm member 18, and the arcuate groove 56 may be provided in the body member 14 to cooperate with the stop pin member.

While this invention has been shown and described in connection with a particular preferred embodiment, it is apparent that various changes and modifications, in addition to those mentioned above, may be made by those who are skilled in the art without departing from the basic features of the invention. Accordingly, it is the intention of the Applicant to protect all variations and modifications within the true spirit and valid scope of this invention.

I claim:

1. An articulated electrical extension device for providing a convenient electrical connection supply outlet comprising a fixed extension body member including an auxiliary electrical outlet plate comprising one end thereof and adapted to be attached and supported over a standard double electrical wall outlet for receiving 110 volt electrical plug connectors with the other end of said fixed extension body member extending upwardly from said auxiliary electrical outlet plate, said auxiliary outlet plate member including standard openings for plug receptacle outlets, an articulated arm member pivotally connected to the upper end of said fixed extension body member and operable to be positioned in vertical alignment with said fixed extension body member to form a further vertical extension of said fixed body or to be positioned on either side of said upper end of said fixed body to provide a horizontal extension, the outer end of said articulated arm member including a standard electrical plug receptacle, an electrical plug connector and electrical conductors carried by said arm member and said fixed body member and connecting said receptacle to said plug connector, said plug connector being adapted to be plugged into the standard wall outlet after the attachment of said extension device by attachment of said auxiliary outlet plate to the standard wall outlet.

2. A device as claimed in claim 1 wherein means is provided for securing said auxiliary plate to the wall outlet.

3. A device as claimed in claim 2 wherein said securing means comprises an opening at the center of said auxiliary plate and a screw-threaded fastening arranged to be attached through said center opening to the outlet by means of the female threads provided at the outlet for mounting the standard outlet cover plate.

4. A device as claimed in claim 3 wherein said auxiliary electrical outlet plate includes a back surface having rearwardly extending flanges around the peripheral edge portions thereof which are arranged and contoured to embrace the edges of a conventional outlet plate when the auxiliary outlet plate is secured to said outlet, said flange portions which embrace the edges of said outlet plate providing stability in the positioning of said body member.

5. A device as claimed in claim 1 wherein there is provided means including at least one opening in said body member for the insertion of a screw-threaded fastener for connecting said body member to the associated wall at a position separated from said auxiliary electrical outlet plate.

6. A device as claimed in claim 1 wherein said body member and said articulated arm member both comprise substantially flat members having spaced central perforations therethrough with said electrical conductors carried by said arm and said fixed body being threaded through said spaced perforations for support of said electrical conductors.

7. A device as claimed in claim 1 wherein said articulated arm member is pivotally connected to the upper end of said body member by a pivotal structure including a pivot pin formed integrally with one of said members and a pivot pin opening in the cooperating end of the other one of said members, and a fastening device secured over the end of said pivot pin after insertion of said pivot pin into said pivot pin opening.

8. A device as claimed in claim 7 wherein
said pivotal connection includes a stop pin integrally formed with the cooperating end of one of said members and an arcuate groove in the other one of said members and arranged in a circular arc about said pivot pin and positioned and arranged to cooperate with said stop pin,
the respective positions of the ends of said arcuate groove with respect to said stop pin corresponding to the limits of rotation desired for said articulated arm member about the upper end of said body member.

9. A device as claimed in claim 8 wherein
the arcuate length of said arcuate groove is substantially equal to just in excess of 180° in order to provide for a total travel of 180° of rotation of said articulated arm member with respect to said body member.

10. A device as claimed in claim 9 wherein
said pivot pin and said stop pin are arranged in vertical alignment when said articulated arm member is in vertical alignment with said body member to form a further vertical extension thereof,
said arcuate groove including a detent opening in the central portion thereof, said pivot pin opening being elongated in the vertical direction when said articulated arm member is positioned in vertical alignment to permit a vertical translational motion of said articulated arm member with respect to said fixed extension body member to lock said stop pin into said detent within said arcuate groove to thereby lock said arm in the vertical alignment position.

11. A device as claimed in claim 10 wherein
said vertical translational motion of said articulated arm member with respect to said body member is vertically downward to thereby cause the gravity force upon said arm member to hold said arm member in the locked vertical alignment position.

12. A device as claimed in claim 11 wherein
said pivot pin and said locking pin are both formed integrally with said body member with said stop pin arranged beneath said pivot pin and in vertical alignment therewith,
said arcuate groove being formed in said articulated arm member and extending equal distances on opposite sides of the center line of said arm member,
said locking detent portion of said arcuate groove being arranged at the center line of said arm member and extending from the inside edge of said arcuate groove.

13. A device as claimed in claim 1 wherein
the minimum combined length of said body member and said articulated arm member when arranged in vertical alignment is equal to in the neighborhood of 57 centimeters when measured from the center of said auxiliary outlet plate to said plug receptacle carried by said arm member.

14. A device as claimed in claim 13 wherein
the minimum length of said articulated arm member from said electrical plug connector to said pivotal connection to said body member is equal to in the neighborhood of 23 centimeters.

* * * * *